United States Patent
Yang

(10) Patent No.: US 12,306,037 B2
(45) Date of Patent: May 20, 2025

(54) METHOD, APPARATUS AND ELECTRONIC DEVICE FOR ESTIMATING SCREEN LIGHT LEAKAGE AMOUNT

(71) Applicant: SHENZHEN GOODIX TECHNOLOGY CO., LTD., Guangdong (CN)

(72) Inventor: Xiangyu Yang, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 357 days.

(21) Appl. No.: 17/849,025

(22) Filed: Jun. 24, 2022

(65) Prior Publication Data
US 2023/0204411 A1    Jun. 29, 2023

(30) Foreign Application Priority Data
Dec. 27, 2021    (CN) .......................... 202111616674.0

(51) Int. Cl.
G01J 1/42    (2006.01)
(52) U.S. Cl.
CPC ....................... G01J 1/42 (2013.01)
(58) Field of Classification Search
None
See application file for complete search history.

(56) References Cited

U.S. PATENT DOCUMENTS

| 2005/0088453 A1 | 4/2005 | Ten |
| 2018/0157121 A1 | 6/2018 | Matsuura et al. |
| 2018/0173145 A1 | 6/2018 | Nakazato |

FOREIGN PATENT DOCUMENTS

| CN | 109817152 A | * | 5/2019 | |
| CN | 112449026 A | | 3/2021 | |
| CN | 112504442 A | | 3/2021 | |
| CN | 112599088 A | | 4/2021 | |
| CN | 112710383 A | * | 4/2021 | ............... G01J 1/00 |
| CN | 112710383 A2 | | 4/2021 | |
| CN | 113077738 A | | 7/2021 | |
| CN | 113188656 A | | 7/2021 | |
| CN | 113257195 A | | 8/2021 | |

* cited by examiner

*Primary Examiner* — Raymond L Nimox
(74) *Attorney, Agent, or Firm* — Scully, Scott, Murphy & Presser, P.C.

(57) ABSTRACT

Embodiments provide a method, an apparatus and an electronic device for estimating a screen light leakage amount, and the method includes: acquiring a first screen light leakage estimation model of a first electronic device; acquiring a first detection value of a variable of the screen light leakage estimation model of the first electronic device under a preset configuration; acquiring a second detection value of the variable of a second electronic device under the preset configuration; determining a difference coefficient of the second electronic device relative to the first electronic device according to the first detection value and the second detection value; and determining a second screen light leakage estimation model of the second electronic device according to the first screen light leakage estimation model and the difference coefficient, and the second screen light leakage estimation model being configured to estimate the screen light leakage amount of the second electronic device.

14 Claims, 2 Drawing Sheets

METHOD, APPARATUS AND ELECTRONIC DEVICE FOR ESTIMATING SCREEN LIGHT LEAKAGE AMOUNT

CROSS-REFERENCE TO RELATED APPLICATIONS

This application claims priority to Chinese Patent Application No. 202111616674.0, filed on Dec. 27, 2021, which is hereby incorporated by reference in its entirety.

TECHNICAL FIELD

Embodiments of the present application relate to the field of photoelectric technologies, and in particular, to a method, an apparatus and an electronic device for estimating a screen light leakage amount.

BACKGROUND

In today's society, with the rapid development of science and technology, electronic device has increasingly become an indispensable tool in people's lives. In order to pursue a better use experience, a full screen has received more and more attention. It is a future development trend for each component of an electronic device to develop under a screen, and an under-screen sensor emerges as the time requires.

The detection of various signal lights by the under-screen sensor must remove an influence of screen light leakage. For example, as a screen transmittance is getting lower and lower, the influence of a screen light leakage amount on an accuracy of ambient light detection is also increasing. Therefore, how to improve the accuracy and adaptability of screen light leakage estimation models for different electronic devices is a difficulty and key for an under-screen light sensing scheme.

SUMMARY

Embodiments of the present application provide a method, an apparatus and an electronic device for estimating a screen light leakage amount, which can enhance a mass producibility of a screen light leakage estimation model on the premise of ensuring an accuracy of the screen light leakage estimation model.

In a first aspect, provided is a method for estimating a screen light leakage amount, including: acquiring a first screen light leakage estimation model of a first electronic device; acquiring a first detection value of a variable of the screen light leakage estimation model of the first electronic device under a preset configuration; acquiring a second detection value of the variable of a second electronic device under the preset configuration; determining a difference coefficient of the second electronic device relative to the first electronic device according to the first detection value and the second detection value; and determining a second screen light leakage estimation model of the second electronic device according to the first screen light leakage estimation model and the difference coefficient, and the second screen light leakage estimation model being configured to estimate the screen light leakage amount of the second electronic device.

In an embodiment of the present application, the screen light leakage estimation model of the first electronic device is adapted to the second electronic device by collecting less data, so that the second electronic device can quickly acquire a more accurate screen light leakage estimation model, so as to enhance a mass producibility of an estimation model on the premise of ensuring a estimation accuracy of the estimation model.

In a possible implementation method, the variable includes a screen light leakage amount and a drop depth of a screen light-emitting drop waveform, the first screen light leakage estimation model is a fitting function of the screen light leakage amount and the drop depth of the first electronic device, and the preset configuration includes a preset bright value and a preset gray value; the first detection value includes a first screen light leakage amount detection value and a first drop depth detection value of the first electronic device under the preset bright value and the preset gray value, and the second detection value includes a second screen light leakage amount detection value and a second drop depth detection value of the second electronic device under the preset bright value and the preset gray value; where the determining the difference coefficient of the second electronic device relative to the first electronic device according to the first detection value and the second detection value, includes: determining the difference coefficient according to a ratio of the first screen light leakage amount detection value to the second screen light leakage amount detection value, and a ratio of the first drop depth detection value to the second drop depth detection value.

In a possible implementation method, the difference coefficient includes a first difference coefficient and a second difference coefficient, and where the determining the difference coefficient according to the ratio of the first screen light leakage amount detection value to the second screen light leakage amount detection value, and the ratio of the first drop depth detection value to the second drop depth detection value, includes: determining the ratio of the first screen light leakage amount detection value to the second screen light leakage amount detection value as the first difference coefficient; and determining the ratio of the first drop depth detection value to the second drop depth detection value as the second difference coefficient.

In a possible implementation method, the first screen light leakage estimation model is:

$$S = \sum_{i=0}^{n-1} k_i * D^i;$$

where S represents the screen light leakage amount of the first electronic device, D represents the drop depth of the first electronic device, k represents a fitting coefficient of the first screen light leakage estimation model, and i is an exponent number; the second screen light leakage estimation model is:

$$S' = \frac{\sum_{i=0}^{n-1} k_i * (D' * \omega)^i}{\varphi};$$

and where S' represents the screen light leakage amount of the second electronic device, D' represents the drop depth of the second electronic device, ω is the first difference coefficient, and φ is the second difference coefficient.

In a possible implementation method, the variable includes a screen light leakage amount and an R unit color gray value, a G unit color gray value and a B unit color gray value, the first screen light leakage estimation model is a fitting function of the screen light leakage amount of the first electronic device and the R unit color gray value, the G unit color gray value and the B unit color gray value, and the preset configuration includes a preset first bright value, a preset second bright value, a preset third bright value, a preset first gray value, a preset second gray value and a preset third gray value; the first detection value includes a third screen light leakage amount detection value of the first electronic device under the first bright value and the first gray value when a screen displays a R unit color, a detection value of a fourth screen light leakage amount under the second bright value and the second gray value when the screen displays a G unit color and a fifth screen light leakage amount detection value under the third bright value and the third gray value when the screen displays a B unit color, the second detection value includes a sixth screen light leakage amount detection value of the second electronic device under the first bright value and the first gray value when the screen displays the R unit color, a seventh screen light leakage amount detection value under the second bright value and the second gray value when the screen displays the G unit color and an eighth screen light leakage amount detection value under the third bright value and the third gray value when the screen displays the B unit color; and where the determining the difference coefficient of the second electronic device relative to the first electronic device according to the first detection value and the second detection value, includes: determining the difference coefficient according to a ratio of the third screen light leakage amount detection value to the sixth screen light leakage amount detection value, a ratio of the fourth screen light leakage amount detection value to the seventh screen light leakage amount detection value, and a ratio of the fifth screen light leakage amount detection value to the eighth screen light leakage amount detection value.

In a possible implementation method, the difference coefficient includes a third difference coefficient, a fourth difference coefficient and a fifth difference coefficient, and where the determining the difference coefficient according to the ratio of the third screen light leakage amount detection value to the sixth screen light leakage amount detection value, the ratio of the fourth screen light leakage amount detection value to the seventh screen light leakage amount detection value, and the ratio of the fifth screen light leakage amount detection value to the eighth screen light leakage amount detection value, includes: determining the ratio of the third screen light leakage amount detection value to the sixth screen light leakage amount detection value as the third difference coefficient; determining the ratio of the fourth screen light leakage amount detection value to the seventh screen light leakage amount detection value as the fourth difference coefficient; and determining the ratio of the fifth screen light leakage amount detection value to the eighth screen light leakage amount detection value as the fifth difference coefficient.

In a possible implementation method, the first screen light leakage estimation model is:

$$S = \sum_{i=0}^{n-1} x_i * R_{gray}^i + \sum_{i=0}^{n-1} y_i * G_{gray}^i + \sum_{i=0}^{n-1} z_i * B_{gray}^i;$$

where S represents the screen light leakage amount of the first electronic device, $R_{gray}$ represents the R unit color gray value, $G_{gray}$ represents the G unit color gray value, $B_{gray}$ represents the B unit color gray value, x, y, and z represent the fitting coefficients of the first screen light leakage estimation model, and i represents an exponent number; the second screen light leakage estimation model is:

$$S' = \frac{\sum_{i=0}^{n-1} x_i * R_{gray}^i}{\alpha} + \frac{\sum_{i=0}^{n-1} y_i * G_{gray}^i}{\beta} + \frac{\sum_{i=0}^{n-1} z_i * B_{gray}^i}{\chi};$$

and where S' represents the screen light leakage amount of the second electronic device, $\alpha$ represents the third difference coefficient, $\beta$ represents the fourth difference coefficient, and $\chi$ represents the fifth difference coefficient.

In a second aspect, provided is an apparatus for estimating a screen light leakage amount, and the apparatus is configured to execute the method in the first aspect and the method in any possible implementation manner of the first aspect.

In a third aspect, provided is an electronic device, the electronic device is a second electronic device, including a processor, and the processor is configured to execute the method in the first aspect and the method in any possible implementation manner of the first aspect.

On the basis of the above technical solutions, the second electronic device does not need to re-establish a complex screen light leakage estimation model and execute operations such as model data collection and relationship function fitting. It only needs to adapt the screen light leakage estimation model of the first electronic device to the second electronic device under the condition of very small amount of collected data and very simple calculation resources, which greatly simplifies the complexity of establishing the screen light leakage estimation model for batch devices and shortens the time required for establishing the model, so as to quickly determine the screen light leakage estimation model of the second electronic device, and enhance a mass producibility of an estimation model on the premise of ensuring a estimation accuracy of the estimation model.

DESCRIPTION OF EMBODIMENTS

Figure 1:
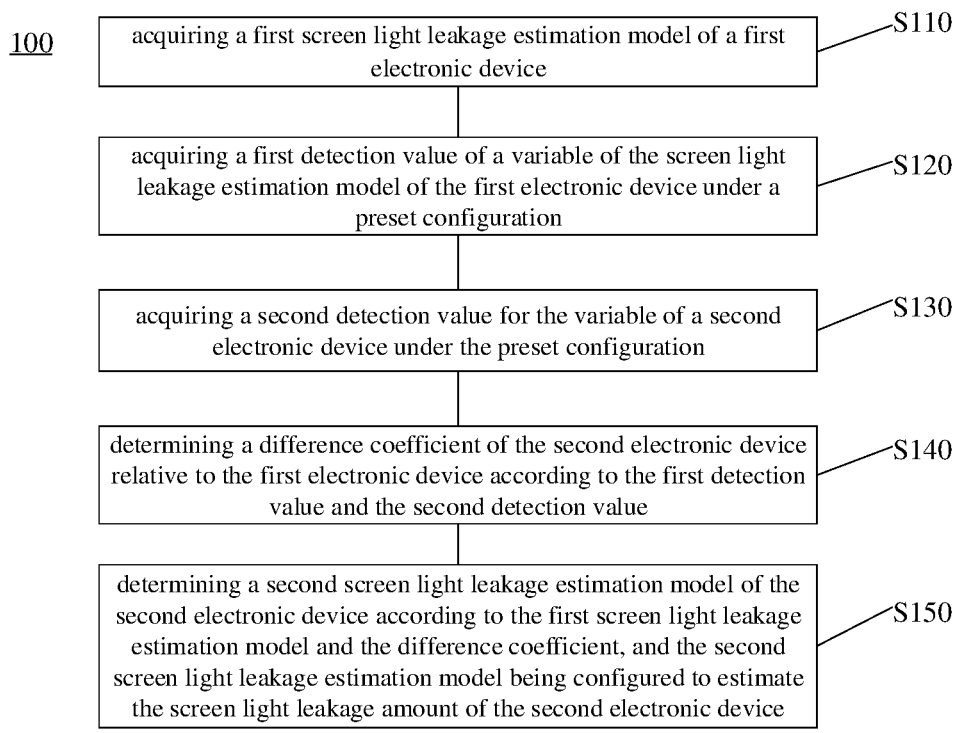
FIG. 1 is a schematic diagram of a method for estimating a screen light leakage amount provided by an embodiment of the present application.

Technical solutions of the present application are described below in combination with accompanying drawings.

With the increasing demand for a full screen in the mainstream market, more front-facing components need to be moved under a screen, such as a proximity sensor and an ambient light sensor, etc. For the ambient light sensor, the detection of ambient light must remove an influence of screen light leakage. Moreover, as a screen transmittance is getting lower and lower, the influence of a screen light leakage amount on an accuracy of ambient light detection is also increasing. Therefore, it is imperative to study a screen light leakage amount estimation model.

In a screen light leakage estimation scheme, screen display contents are all scanned in sequence according to a screen luminous pixelline to quickly refresh a picture, and a screen luminous power will not remain unchanged all the time. Generally, there will be an area with a high luminous power and an area with a low luminous power, and in a switching interval between a previous picture and a later picture, the luminous power of the screen luminous pixel is the lowest, and a drop waveform similar to a sine wave can be seen by high-speed sampling with the ambient light sensor. Where a difference between a peak and a trough is called a drop depth. Taking advantage of a feature that the drop depth of the drop waveform of the screen luminous is not related to the ambient light, a relationship model of "drop depth-screen light leakage amount" can be established to estimate screen light leakage. Due to the differences in screen driving, an organic light-emitting diode (OLED) screen generally has direct current (DC) dimming, pulse width modulation (PWM) dimming, and PWM and DC hybrid dimming. In order to improve the accuracy of the "drop depth-screen light leakage amount" model, it is often necessary to use a higher-order fitting function $$L = \sum_{i=0}^{n-1} k_i * D^i,$$

where L is the screen light leakage amount, D is the drop depth, $k_0, \ldots, k_{n-1}$ is fitting coefficients, and i is an exponent number. And under different system bright, the fitting coefficients $k_0, \ldots, k_{n-1}$ may be different.

Due to the establishment of the fitting function $$L = \sum_{i=0}^{n-1} k_i * D^i,$$

enough sample points must be collected for model parameter correction, that is, it is necessary to set a multi-grade system bright and a gray of a machine for data sampling to obtain a set of sample space $(D_0, L_0), (D_1, L_1), \ldots, D_{m-1}, L_{m-1})$ for a high-order polynomial fitting. Where $D_0, D_1, \ldots, D_{m-1}$ represents sampling values of the drop depth D, and $L_0, L_1, \ldots, L_{m-1}$ represents the sampling values of the screen light leakage amount L. Due to the differences of a screen luminous intensity, a screen transmittance, a photosensitive characteristic parameter of a sensor module and a module fitting structure parameter of different electronic devices, a model $$L = \sum_{i=0}^{n-1} k_i * D^i,$$

obtained on one electronic device cannot adapt to all electronic devices, so such a model establishment scheme cannot meet the needs of mass production, and it can't really be applied to a mass production project; or in other words, without considering the difference of the model parameter of different electronic devices, a fixed model parameter is used for all electronic devices, which will greatly reduce the accuracy of a model estimation result of a mass-produced electronic device.

In another screen light leakage estimation scheme, the screen light leakage estimation is performed according to the relationship model between a screen display content of three-primary colors R, G and B gray matrix and the screen light leakage amount, and a high-order fitting function $$L = \sum_{i=0}^{n-1} x_i * R_{gray}^i + \sum_{i=0}^{n-1} y_i * G_{gray}^i + \sum_{i=0}^{n-1} z_i * B_{gray}^i$$

is also needed, where L is the screen light leakage amount, $R_{gray}$, $G_{gray}$ and $B_{gray}$ are the gray values of the three-primary colors R, G and B respectively, $x_0, \ldots, x_{n-1}, y_0, \ldots y_{n-1}$ and $z_0, \ldots, z_{n-1}$ are fitting coefficients of $R_{gray}$, $G_{gray}$ and $B_{gray}$ as well as the screen light leakage amount respectively, and i is the exponent number. And under the different system bright, the above fitting coefficients are different.

Similarly, since the establishment of $$L = \sum_{i=0}^{n-1} x_i * R_{gray}^i + \sum_{i=0}^{n-1} y_i * G_{gray}^i + \sum_{i=0}^{n-1} z_i * B_{gray}^i,$$

it is also necessary to set different grays of R, G and B monochromatic light under the different system bright for data sampling to obtain three sets of sample spaces $(R_0, LR_0), \ldots (R_{m-1}, LR_{m-1})$, $(G_0, LG_0), \ldots, (G_{m-1}, LG_{m-1})$ and $(B_0, LB_0), \ldots, (B_{m-1}, LB_{m-1})$ for the high-order polynomial fitting. Where $R_0, \ldots, R_{m-1}, G_0, \ldots, G_{m-1}$ and $B_0, \ldots, B_{m-1}$ respectively represents the different gray values of three kinds of R, G and B monochromatic light, and $LR_0, \ldots, LR_{m-1}$, and $LB_0, \ldots, LB_{m-1}$ respectively represents the sampling values of the screen light leakage amount L under the condition of corresponding grays. Similar to the above screen light leakage estimation model, due to the differences of the screen luminous intensity, the screen transmittance, the photosensitive characteristic parameter of the sensor module and the module fitting structure parameter of different electronic devices, a model $$L = \sum_{i=0}^{n-1} x_i * R_{gray}^i + \sum_{i=0}^{n-1} y_i * G_{gray}^i + \sum_{i=0}^{n-1} z_i * B_{gray}^i$$

obtained on one electronic device cannot adapt to other electronic devices. If other electronic devices also use this method to establish the screen light leakage estimation model, it will take a long time to establish the model, so this estimation scheme cannot be used as a screen light leakage estimation scheme with high accuracy, high performance, and mass producibility.

In view of this, embodiments of the present application provide a method for estimating a screen light leakage amount, which can adapt the screen light leakage estimation model of a reference electronic device to other electronic devices by collecting less data, and enhance a mass producibility of the screen light leakage estimation model on the premise of ensuring a estimation accuracy of the screen light leakage estimation model.

FIG. 1 is a schematic diagram of a method 100 for estimating a screen light leakage amount of an embodiment of the present application. The method 100 shown in FIG. 1 may be executed by a processor. For example, it may be executed by a main control processor of the second electronic device in the embodiment of the present application, and may also be executed by the main control processor of other test devices. The second electronic device may be a mass-produced electronic device. The application embodiment does not limit the execution subject of the method 100. As shown in FIG. 1, the method 100 includes some or all of the following contents:

S110, acquiring a first screen light leakage estimation model of a first electronic device.

S120, acquiring a first detection value of a variable of the screen light leakage estimation model of the first electronic device under a preset configuration.

S130, acquiring a second detection value of the variable of a second electronic device under the preset configuration.

S140, determining a difference coefficient of the second electronic device relative to the first electronic device according to the first detection value and the second detection value.

S150, determining a second screen light leakage estimation model of the second electronic device according to the first screen light leakage estimation model and the difference coefficient, and the second screen light leakage estimation model being configured to estimate the screen light leakage amount of the second electronic device.

It should be understood that the first electronic device in the embodiment of the present application may be a laboratory machine platform, and may also be referred to as a reference electronic device, moreover, the second electronic device may be any other electronic device except the first electronic device. For example, the second electronic device is any mass-produced electronic device of the same model as the first electronic device.

First, the first electronic device can adopt any screen leakage estimation scheme to establish the first screen light leakage estimation model. For example, the first screen light leakage estimation model is established based on a relationship of "drop depth-screen light leakage amount"; for another example, the first screen light leakage estimation model is established based on a relationship of "three-primary colors R, G and B gray values-screen light leakage amount".

It should be noted that, a process of establishing the screen light leakage estimation model of the first electronic device is actually a process of calculating a fitting coefficient. For example, a process of calculating $k_0, \ldots, k_{n-1}$ in the first screen light leakage estimation scheme; and for another example, a process of calculating $x_0, \ldots, x_{n-1}$, $y_0, \ldots, y_{n-1}$ and $z_0, \ldots, z_{n-1}$ in the second screen light leakage estimation scheme.

It should also be noted that, once the screen light leakage estimation scheme of the first electronic device is determined, the screen light leakage estimation scheme of the second electronic device is also determined. That is, if the first screen light leakage estimation model is established based on the relationship of "drop depth-screen light leakage amount", the second screen light leakage estimation model of the second electronic device is also established based on the relationship of "drop depth-screen light leakage amount". If the first screen light leakage estimation model is established based on the relationship of "three-primary colors R, G and B gray values-screen light leakage amount", the second screen light leakage estimation model of the second electronic device is also established based on the relationship of "three-primary colors R, G and B gray values-screen light leakage amount". In conclusion, the types of the first screen light leakage estimation model and the second screen light leakage estimation model in the embodiments of the present application are the same.

After establishing the first screen light leakage estimation model by the first electronic device, the first detection value of the variable in the first screen light leakage estimation model may further be collected under the preset configuration. The preset configuration may refer to a display configuration of the electronic device, for example, a system bright, a refresh rate of the display screen, or a display gray. The variable in the screen light leakage estimation model may include an independent variable and a dependent variable. For example, in the first screen light leakage estimation scheme, the dependent variable is the screen light leakage amount, and the independent variable is the drop depth, that is, the first screen light leakage estimation model in the embodiment of the present application is a fitting function of the screen light leakage amount and the drop depth of the first electronic device. For another example, in the second screen light leakage estimation scheme, the dependent variable is the screen light leakage amount, and the independent variable is the gray of the three-primary colors R, G and B. That is, the first screen light leakage estimation model in the embodiment of the present application is a the fitting function of the screen light leakage amount of the first electronic device, the R unit color gray value, the G unit color gray value and the B unit color gray value.

When collecting the first detection value of the variable of the first screen light leakage estimation model, the detection values of all variables in the first screen light leakage estimation model may be collected; alternatively, the detection values of part of variables in the first screen light leakage estimation model may also be collected.

The first electronic device can send the first screen light leakage estimation model established by it and the collected first detection value of the variable of the first screen light leakage estimation model to the second electronic device, that is, the second electronic device can acquire the first screen light leakage estimation model and the first detection value from the first electronic device.

As mentioned above, the types of the first screen light leakage estimation model of the first electronic device and the second screen light leakage estimation model of the second electronic device are the same. That is, the variables of the first screen light leakage estimation model and the second screen light leakage estimation model are the same. After the second electronic device acquiring the first screen light leakage estimation model and the first detection value, the second electronic device may collect the second detection value of the variable corresponding to the first detection value, and the second detection value is collected under the same preset configuration as the first detection value. For example, if the first detection value is the drop depth of the first electronic device, the second detection value is also the drop depth of the second electronic device. If the first detection value is the screen light leakage amount of the first electronic device, the second detection value is also the screen light leakage amount of the second electronic device.

It should be understood that, if the detection values of multiple variables in the screen light leakage estimation model under the same preset configuration are acquired, the first detection value and the second detection value are actually a set of values. It should also be understood that, if the detection values of the same variable in the screen light leakage estimation model under the different preset configuration are acquired, the first detection value and the second detection value are also a set of values.

After the second electronic device acquiring the first detection value of the first electronic device and the second detection value of the second electronic device, the difference coefficient of the second electronic device relative to the first electronic device may be further determined according to the first detection value and the second detection value. Since the first detection value and the second detection value are collected under the same preset configuration, the difference coefficient determined by the first detection value and the second detection value is only related to a screen luminous efficiency, a screen transmittance, a sensor sensitivity, a sensor screen bonding distance and other parameters differences of the two electronic devices, and the difference coefficient does not change with the value of the parameters included in the preset configuration. That is, if the preset configuration includes a preset bright value, the difference coefficients determined by the first detection value and the second detection value obtained by the first electronic device and the second electronic device are the same when the preset bright values are 50 and 100 respectively.

Optionally, the difference coefficient may be determined based on a ratio between the first detection value and the second detection value. However, those skilled in the art understand that the embodiments of the present application are not limited thereto. For example, the difference coefficient may also be determined by the difference value between the first detection value and the second detection value.

It should be noted that, if the first detection value and the second detection value are the set of values, the difference coefficient is also the set of values. Moreover, each difference coefficient is determined by the first detection value and the second detection value of the same variable.

After determining the difference coefficient, the second electronic device may determine the second screen light leakage estimation model of the second electronic device based on the first screen light leakage estimation model of the first electronic device and the difference coefficient, and the second screen light leakage estimation model being configured to estimate the screen light leakage amount of the second electronic device.

Therefore, the method for estimating the screen light leakage amount of an embodiment of the present application can adapt the screen light leakage estimation model of the first electronic device to the second electronic devices by collecting less data, so that the second electronic device can quickly acquire a more accurate screen light leakage estimation model, so as to enhance a mass producibility of an estimation model on the premise of ensuring a estimation accuracy of the estimation model.

Optionally, in an embodiment of the present application, the variable includes a screen light leakage amount and a drop depth of a screen light-emitting drop waveform, the first screen light leakage estimation model is a fitting function of the screen light leakage amount and the drop depth of the first electronic device, and the preset configuration includes a preset bright value and a preset gray value; the first detection value includes a first screen light leakage amount detection value and a first drop depth detection value of the first electronic device under the preset bright value and the preset gray value, and the second detection value includes a second screen light leakage amount detection value and a second drop depth detection value of the second electronic device under the preset bright value and the preset gray value; where the determining the difference coefficient of the second electronic device relative to the first electronic device according to the first detection value and the second detection value, includes: determining the difference coefficient according to a ratio of the first screen light leakage amount detection value to the second screen light leakage amount detection value, and a ratio of the first drop depth detection value to the second drop depth detection value.

Specifically, in the embodiment, the first electronic device needs to preset system bright and gray, the system bright refers to the different luminous power levels of the screen, and the higher the level, the stronger the display bright; and the gray refers to the gray value of a picture displayed on the screen. The first electronic device detects the screen light leakage amount and the drop depth under the preset bright value and the preset gray value to obtain the first screen light leakage amount detection value and the first drop depth detection value. Similarly, the second electronic device also detects the screen light leakage amount and the drop depth under the same preset bright value and preset gray value to obtain the second screen light leakage amount detection value and the second drop depth detection value. After the second electronic device acquiring the first screen light leakage amount detection value, the first drop depth detection value, the second screen light leakage amount detection value and the second drop depth detection value, the difference coefficient may be further determined according to the ratio of the first screen light leakage amount detection value to the second screen light leakage amount detection value, and the ratio of the first drop depth detection value to the second drop depth detection value.

It should be understood that the ratio of the first screen light leakage amount detection value to the second screen light leakage amount detection value may be the first screen light leakage amount detection value/the second screen light leakage amount detection value, or it may be the second screen light leakage amount detection value/the first screen light leakage amount detection value; and similarly, the ratio of the first drop depth detection value to the second drop depth detection value may be the first drop depth detection value/the second drop depth detection value, or it may be the second drop depth detection value/the first drop depth detection value.

In other embodiments, the difference coefficient may also be determined based on a difference value between the first screen light leakage amount detection value and the second screen light leakage amount detection value, and a difference value between the first drop depth detection value and the second drop depth detection value. Any data processing method that can reflect the difference between the first electronic device and the second electronic device can be used to acquire the difference coefficient in the embodiment of the present application.

Further, in one example, the difference coefficient includes a first difference coefficient and a second difference coefficient, and where the determining the difference coefficient according to the ratio of the first screen light leakage amount detection value to the second screen light leakage amount detection value, and the ratio of the first drop depth detection value to the second drop depth detection value, includes: determining the ratio of the first screen light leakage amount detection value to the second screen light leakage amount detection value as the first difference coefficient; and determining the ratio of the first drop depth detection value to the second drop depth detection value as the second difference coefficient.

In other examples, other processing may be performed on the ratio of the first screen light leakage amount detection value to the second screen light leakage amount detection value to obtain the first difference coefficient. Other processing may be performed on the ratio of the first drop depth detection value to the second drop depth detection value to obtain the second difference coefficient. For example, multiplying the ratio of the first screen light leakage amount detection value to the second screen light leakage amount detection value by a first coefficient to obtain the first difference coefficient; and multiplying the ratio of the first drop depth detection value to the second drop depth detection value by a second coefficient to obtain the second difference coefficient.

That is, the first difference coefficient in the embodiment of the present application may be directly or indirectly determined by the ratio of the first screen light leakage amount detection value to the second screen light leakage amount detection value, and the second difference coefficient may be directly or indirectly determined by the ratio of the first drop depth detection value to the second drop depth detection value.

Further, in the embodiment, the first screen light leakage estimation model is:

$$S = \sum_{i=0}^{n-1} k_i * D^i;$$

where S represents the screen light leakage amount of the first electronic device, D represents the drop depth of the first electronic device, k represents the fitting coefficient of the first screen light leakage estimation model, and i is an exponent number; the second screen light leakage estimation model is:

$$S' = \frac{\sum_{i=0}^{n-1} k_i * (D' * \omega)^i}{\varphi};$$

and where S' represents the screen light leakage amount of the second electronic device, D' represents the drop depth of the second electronic device, ω is the first difference coefficient, and φ is the second difference coefficient.

As described above, under the different system bright, the fitting coefficients $k_0, \ldots, k_{n-1}$ are different. That is, under the different system bright, the first screen light leakage estimation models established by the first electronic device are different. The second screen light leakage estimation model determined in the embodiment of the present application is suitable for the system bright set when establishing the first screen light leakage estimation model with the first electronic device. For example, the first screen light leakage estimation model is established when the system bright is 50, and the second screen light leakage estimation model is also suitable for estimating the screen light leakage amount of the second electronic device when the system bright is 50.

Optionally, in the embodiment, the preset bright value may be a range interval such as 0~100, 0~255, 0~2047 or 0~8191, and bright setting intervals of different electronic devices may be different; and the value of the preset gray value may be in the range interval of 0~255, and gray setting intervals of different electronic devices are generally the same.

Optionally, in another embodiment of the present application, the variable includes a screen light leakage amount and an R unit color gray value, a G unit color gray value and a B unit color gray value, the first screen light leakage estimation model is the fitting function of the screen light leakage amount of the first electronic device and the R unit color gray value, the G unit color gray value and the B unit color gray value, and the preset configuration includes a preset first bright value, a preset second bright value, a preset third bright value, a preset first gray value, a preset second gray value and a preset third gray value; the first detection value includes a third screen light leakage amount detection value under the first bright value and the first gray value when a screen displays a R unit color, a fourth screen light leakage amount detection value under the second bright value and the second gray value when the screen displays a G unit color and a fifth screen light leakage amount detection value under the third bright value and the third gray value when the screen displays a B unit color of the first electronic device, the second detection value includes a sixth screen light leakage amount detection value under the first bright value and the first gray value when the screen displays the R unit color, a seventh screen light leakage amount detection value under the second bright value and the second gray value when the screen displays the G unit color and an eighth screen light leakage amount detection value under the third bright value and the third gray value when the screen displays the B unit color of the second electronic device; and determining the difference coefficient of the second electronic device relative to the first electronic device according to the first detection value and the second detection value, including: determining the difference coefficient according to a ratio of the third screen light leakage amount detection value to the sixth screen light leakage amount detection value, a ratio of the fourth screen light leakage amount detection value to the seventh screen light leakage amount detection value, and a ratio of the fifth screen light leakage amount detection value to the eighth screen light leakage amount detection value.

Specifically, in the embodiment, the first electronic device needs to preset system bright and gray. The first electronic device detects the screen light leakage amount under the preset bright value and the preset gray value. It should be noted that, in the embodiment, the first electronic device needs to collect the screen light leakage amount under different unit color backgrounds to obtain the third screen light leakage amount detection value, the fourth screen light leakage amount detection value and the fifth screen light leakage amount detection value. The preset bright values and the preset gray values under different unit color backgrounds may be the same or different. For example, the first bright value is 100 and the first gray value is 40 when the screen displays an R unit color background; the second bright value is 150 and the second gray value is 85 when the screen displays a G unit color background; and the third bright value is 1000 and the third gray value is 164 when the screen displays a B unit color background. For another example, the first bright value is 100 and the first gray value is 40 when the screen displays the R unit color background; the second bright value is 100 and the second gray value is 40 when the screen displays the G unit color background; and the third bright value is 100 and the third gray value is 40 when the screen displays the B unit color background. Similarly, the second electronic device also respectively collects the screen light leakage amount under different unit color backgrounds under the same preset bright value and preset gray value to obtain a sixth screen light leakage amount detection value, a seventh screen light leakage amount detection value and an eighth screen light leakage amount detection value. After the second electronic device acquiring the third screen light leakage amount detection value, the fourth screen light leakage amount detection value, the fifth screen light leakage amount detection value, the sixth screen light leakage amount detection value, the seventh screen light leakage amount detection value and the eighth screen light leakage amount detection value, the difference coefficient can be determined according to a ratio of the third screen light leakage amount detection value to the sixth screen light leakage amount detection value, a ratio of the fourth screen light leakage amount detection value to the seventh screen light leakage amount detection value, and a ratio of the fifth screen light leakage amount detection value to the eighth screen light leakage amount detection value.

Optionally, in the embodiment, the preset bright value may be a range interval such as 0~100, 0~255, 0~2047 or 0~8191, and bright setting ranges of different electronic devices may be different; and the value of the preset gray value may be in the range interval of 0~255, and gray setting intervals of different electronic devices are generally the same.

It should be understood that the ratio of the third screen light leakage amount detection value to the sixth screen light leakage amount detection value may be the third screen light leakage amount detection value/the sixth screen light leakage amount detection value, or it may be the sixth screen light leakage amount detection value/the third screen light leakage amount detection value; similarly, the ratio of the fourth screen light leakage amount detection value to the seventh screen light leakage amount detection value may be the fourth screen light leakage amount detection value/the seventh screen light leakage amount detection value, or it may be the seventh screen light leakage amount detection value/the fourth screen light leakage amount detection value; and similarly, the ratio of the fifth screen light leakage amount detection value to the eighth screen light leakage amount detection value may be the fifth screen light leakage amount detection value/the eighth screen light leakage amount detection value, or it may be the eighth screen light leakage amount detection value/the fifth screen light leakage amount detection value.

In other embodiments, the difference coefficient can also be determined based on a difference value between the third screen light leakage amount detection value and the sixth screen light leakage amount detection value, a difference value between the fourth screen light leakage amount detection value and the seventh screen light leakage amount detection value and a difference value between the fifth screen light leakage amount detection value and the eighth screen light leakage amount detection value. Any data processing method that can reflect the difference between the first electronic device and the second electronic device can be used to acquire the difference coefficient in the embodiment of the present application.

Further, in one example, the difference coefficient includes a third difference coefficient, a fourth difference coefficient and a fifth difference coefficient, and determining the difference coefficient according to the ratio of the third screen light leakage amount detection value to the sixth screen light leakage amount detection value, the ratio of the fourth screen light leakage amount detection value to the seventh screen light leakage amount detection value, and the ratio of the fifth screen light leakage amount detection value to the eighth screen light leakage amount detection value, including: determining the ratio of the third screen light leakage amount detection value to the sixth screen light leakage amount detection value as the third difference coefficient; determining the ratio of the fourth screen light leakage amount detection value to the seventh screen light leakage amount detection value as the fourth difference coefficient; and determining the ratio of the fifth screen light leakage amount detection value to the eighth screen light leakage amount detection value as the fifth difference coefficient.

In other examples, other processing may be performed on the ratio of the third screen light leakage amount detection value to the sixth screen light leakage amount detection value to obtain the third difference coefficient. Other processing may be performed on the ratio of the fourth screen light leakage amount detection value to the seventh screen light leakage amount detection value to obtain the fourth difference coefficient. Other processing may be performed on the ratio of the fifth screen light leakage amount detection value to the eighth screen light leakage amount detection value to obtain the fifth difference coefficient. For example, multiplying the ratio of the third screen light leakage amount detection value to the sixth screen light leakage amount detection value by a third coefficient to obtain the third difference coefficient; multiplying the ratio of the fourth screen light leakage amount detection value to the seventh screen light leakage amount detection value by a fourth coefficient to obtain the fourth difference coefficient; and multiplying the ratio of the fifth screen light leakage amount detection value to the eighth screen light leakage amount detection value by a fifth coefficient to obtain the fifth difference coefficient.

That is, the third difference coefficient in the embodiment of the present application may be directly or indirectly determined by the ratio of the third screen light leakage amount detection value to the sixth screen light leakage amount detection value, the fourth difference coefficient may be directly or indirectly determined by the ratio of the fourth screen light leakage amount detection value to the seventh screen light leakage amount detection value, and the fifth difference coefficient may be directly or indirectly determined by the ratio of the fifth screen light leakage amount detection value to the eighth screen light leakage amount detection value.

Further, in the embodiment, the first screen light leakage estimation model is:

$$S = \sum_{i=0}^{n-1} x_i * R_{gray}^i + \sum_{i=0}^{n-1} y_i * G_{gray}^i + \sum_{i=0}^{n-1} z_i * B_{gray}^i;$$

where S represents the screen light leakage amount of the first electronic device, $R_{gray}$ represents the R unit color gray value, $G_{gray}$ represents the G unit color gray value, $B_{gray}$ represents the B unit color gray value, x, y, and z represent the fitting coefficients of the first screen light leakage estimation model, and i represents an exponent number; the second screen light leakage estimation model is:

$$S' = \frac{\sum_{i=0}^{n-1} x_i * R_{gray}^i}{\alpha} + \frac{\sum_{i=0}^{n-1} y_i * G_{gray}^i}{\beta} + \frac{\sum_{i=0}^{n-1} z_i * B_{gray}^i}{\chi};$$

and where S' represents the screen light leakage amount of the second electronic device, α represents the third difference coefficient, β represents the fourth difference coefficient, and χ represents the fifth difference coefficient.

It should be understood that no matter $R_{gray}$, $R_{gray}$ and $B_{gray}$ in the first screen light leakage estimation model, or $R_{gray}$, $G_{gray}$ and $B_{gray}$ in the second screen light leakage estimation model, are all related to the screen display content, as long as the screen display content is determined, $R_{gray}$, $G_{gray}$ and $B_{gray}$ are determined. Moreover, $R_{gray}$, $G_{gray}$ and $B_{gray}$ can all take values in a same gray setting interval, for example, the gray setting interval is 0~255.

It should be noted that, in addition to an RGB format, the screen display content in the embodiment may also be a YUV format, that is, the screen light leakage estimation model may be a fitting function of the screen light leakage amount, the gray value and chromaticity.

As described above, under the different system bright, the fitting coefficients $x_{n-1} \ldots x_{n-1}$, $y_0 \ldots y_{n-1}$, $z_0 \ldots z_{n-1}$ are different. That is, under the different system bright, the first screen light leakage estimation models established by the first electronic device are different. But the second screen light leakage estimation model is suitable for the system bright set when establishing the first screen light leakage estimation model with the first electronic device. For example, the first screen light leakage estimation model is established when the system bright is 50, and the second screen light leakage estimation model is also suitable for estimating the screen light leakage amount of the second electronic device when the system bright is 50.

Optionally, in the embodiment of the present application, the screen light leakage amount of the second electronic device is used to eliminate the screen light leakage in ambient light detected by the ambient light sensor in the second electronic device. That is, the ambient light detected by the ambient light sensor is actually mixed light, and the light intensity of the mixed light includes not only the light intensity of the ambient light where the second electronic device is located, but also the light intensity of screen leakage. The light intensity of the actual ambient light can be obtained by subtracting the screen light leakage amount estimated by the second screen light leakage estimation model from the light intensity of the mixed light.

It should be understood that the screen light leakage amount estimated by the second screen light leakage estimation model in the embodiment of the present application is not only suitable for eliminating screen light leakage in the ambient light, but also suitable for eliminating screen light leakage mixed in any other signal, for example, commonly used ambient light color temperature detection application also needs to estimate screen light leakage firstly.

Taking the function of eliminating the screen light leakage in the ambient light detected by the ambient light sensor as an example, generally, a photosensitive channel of the ambient light sensor may include one channel, or multiple channels, for example, the multiple channels are an R channel, a G channel, a B channel and a W channel, for each channel, the technical solution provided by the embodiment of the present application can be used to acquire the screen light leakage estimation model of the channel, and further estimate the screen light leakage amount of the channel, so as to eliminate the screen light leakage in the ambient light detected by the channel, and each channel is independent of each other.

The technical solution of the embodiment of the application will be described in detail below in combination with the above two screen light leakage estimation models respectively. It should be understood that the method 100 is suitable for any screen light leakage estimation model, which is not limited by the embodiments of the present application.

Embodiment 1

Step 1. According to a laboratory machine platform 1 #(that is, the above first electronic device), a high-accuracy screen light leakage estimation model has been established through a complex calibration process. If the screen light leakage amount of each photosensitive channel of the ambient light sensor is expressed by $S_0, \ldots, S_{c-1}$, and the drop depth of each photosensitive channel is expressed by $D_0, \ldots, D_{c-1}$, the first screen light leakage estimation model is:

$$S_j = \sum_{i=0}^{n-1} k_{ij} * D_j^i \quad (j = 0, 1, \ldots, c-1) \qquad 1\text{-}1$$

where j represents the channel.

Step 2. Use the laboratory machine platform 1 #, set the system bright (the value can be in the range interval such as 0~100, 0~255, 0~2047 or 0~8191, and the bright setting intervals of different machine models may be different) and gray (the value is in the range interval of 0~255, and the gray setting intervals of different machine models are generally the same) in a dark room environment, collect the detection value of a light leakage amount and the detection value of the drop depth of each channel of the ambient light sensor, and record them as follows:

$s_0 \ldots s_{c-1}; d_0 \ldots d_{c-1}$.

Step 3. Use any other machine 2 #(the above second electronic device), repeat the operation of the above step 2 (that is, the system bright is set to be the same as that in step 2, and the gray is also set to be the same as that in step 2), and the detection value of the light leakage amount and the detection value of the drop depth of each channel of the ambient light sensor can be obtained, and record them as follows:

$s'_0 \ldots s'_{c-1}; d'_0 \ldots d'_{c-1}$.

Step 4. The difference coefficient of the screen light leakage amount and the drop depth of the machine 2 # relative to the machine 1 # is obtained, and a calculation formula is as follows:

$$\varphi_j = \frac{s_j}{s'_j} \qquad 1\text{-}2$$

$$\omega_j = \frac{d_j}{d'_j} \qquad 1\text{-}3$$

Step 5. Because the fundamental reason for the difference coefficients of the screen light leakage and the difference coefficients of the drop depth between the machine 1 # and 2 # is the difference in parameters such as the screen luminous efficiency, the screen transmittance, the sensor sensitivity, the sensor screen bonding distance and other parameters differences of the two machines, and the difference does not change with the change of a displaying gray and a system bright, and formulas 1-2 and 1-3 are substituted into formula 1-1 to obtain the screen light leakage estimation model of the machine 2 # as follows:

$$S'_j = \frac{\sum_{i=0}^{n-1} k_{ij} * (D'_j * \omega_j)^i}{\varphi_j} \quad (j = 0, 1, \ldots, c-1) \qquad 1\text{-}4$$

In Embodiment 1, the model establishment process of data collection and model parameter fitting of the laboratory machine platform in the above steps 1 and 2 are separated from a rapid correction operation of any machine platform in steps 3-5, so that the screen light leakage estimation model of any other machine platform can be determined under the condition of very small amount of collected data and very simple calculation resources, and enhance the mass producibility of the estimation model on the premise of ensuring the estimation accuracy of the estimation model.

Embodiment 2

Step 1. According to the laboratory machine platform 1 #, the high-accuracy screen light leakage estimation model has been established through the complex calibration process. If the screen light leakage amount of each photosensitive channel of the ambient light sensor is expressed by $S_0, \ldots, S_{c-1}$, the first screen light leakage estimation model is:

$$S = \sum_{i=0}^{n-1} x_i * R^i_{gray} + \sum_{i=0}^{n-1} y_i * G^i_{gray} + \sum_{i=0}^{n-1} z_i * B^i_{gray} \qquad 2\text{-}1$$

where j represents the channel.

Step 2. Use the laboratory machine platform 1 #, set the system bright (the value can be in the range interval such as 0~100, 0~255, 0~2047 or 0~8191, and the bright setting intervals of different machine models may be different) and gray value displays the R unit color background (the value is in the range interval of 0~255, and the gray setting intervals of different machine models are generally the same) in a dark room environment, collect the detection value of a light leakage amount of each channel of the ambient light sensor, and record them as follows:

$s_{0\_R} \cdots s_{c-1\_R}$;

Step 3. Similar to step 2, use the laboratory machine platform 1 #, set the system bright (the value can be in the range interval such as 0~100, 0~255, 0~2047 or 0~8191, and the bright setting intervals of different machine models may be different) and gray value displays the G unit color background (the value is in the range interval of 0~255, and the gray setting intervals of different machine models are generally the same) in a dark room environment, collect the detection value of a light leakage amount of each channel of the ambient light sensor, and record them as follows:

$s_{0\_G}, \cdots s_{c-1\_G}$;

Step 4. Similar to step 2, use the laboratory machine platform 1 #, set the system bright (the value can be in the range interval such as 0~100, 0~255, 0~2047 or 0~8191, and the bright setting intervals of different machine models may be different) and gray value displays the B unit color background (the value is in the range interval of 0~255, and the gray setting intervals of different machine models are generally the same) in a dark room environment, collect the detection value of a light leakage amount of each channel of the ambient light sensor, and record them as follows:

$s_{0\_B} \cdots s_{c-1\_B}$;

Step 5. Use any other machine 2 #, collect the detection value of the light leakage amount of each channel of the ambient light sensor under the configurations of the above steps 2-4 respectively, and record them as follows:

$s'_{0\_R} \cdots s'_{c-1\_R}$;
$s'_{0\_G} \cdots s'_{c-1\_G}$; and
$s'_{0\_B} \cdots s'_{c-1\_B}$.

Step 6. The difference coefficient of the screen light leakage amount of the machine 2 # relative to the machine 1 # is obtained, and a calculation formula is as follows:

$$\alpha_j = \frac{S_{j\_R}}{S'_{j\_R}} \qquad 2\text{-}2$$

$$\beta_j = \frac{S_{j\_G}}{S'_{j\_G}} \qquad 2\text{-}3$$

$$\chi_j = \frac{S_{j\_B}}{S'_{j\_B}} \qquad 2\text{-}4$$

Step 7. Substitute formulas 2-2, 2-3 and 2-4 into formula 2-1 to obtain the screen light leakage estimation model of the machine 2 # as follows:

$$S'_j = \frac{\sum_{i=0}^{n-1} x_{ij} * R^i_{gray}}{\alpha_j} + \frac{\sum_{i=0}^{n-1} y_{ij} * R^i_{gray}}{\beta_j} + \frac{\sum_{i=0}^{n-1} z_{ij} * R^i_{gray}}{\chi_j} \qquad 2\text{-}5$$

$(j = 0, 1, \ldots, c-1)$

In Embodiment 2, the model establishment process of the data collection and the model parameter fitting of the laboratory machine platform in the above steps 1-4 are separated from the rapid correction operation of any machine platform in steps 5-7, the model establishment process needs to collect data of a lot of backgrounds under the different system bright, different monochrome backgrounds and different grays, and carry out a high-order polynomial or a more complex fitting operation. The rapid correction operation only needs to collect the data of three backgrounds, and only needs a simple division operation, so that the screen light leakage estimation model of any other machine platform can be determined under the condition of very small amount of collected data and very simple calculation resources, and enhance the mass producibility of the estimation model on the premise of ensuring the estimation accuracy of the estimation model.

A method for estimating the screen light leakage amount according to an embodiment of the present application is described in detail above. A device for estimating the screen light leakage amount according to an embodiment of the present application will be described below combined with FIG. 2, and the technical features described in the method embodiment are suitable for the following device embodiments.

Figure 2:
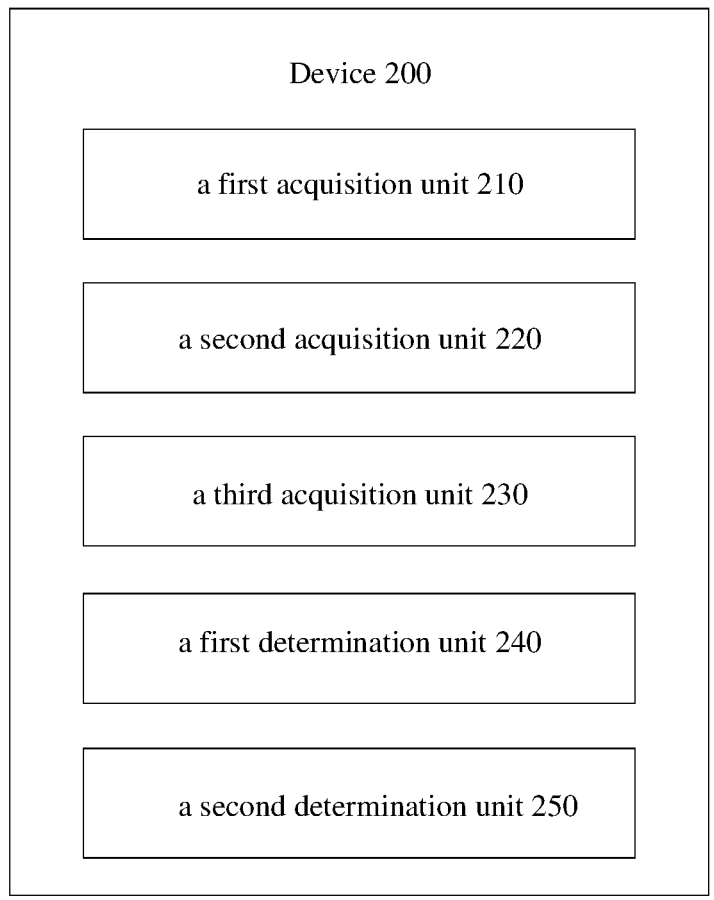
FIG. 2 is a schematic diagram of an apparatus for estimating a screen light leakage amount provided by an embodiment of the present application.

FIG. 2 shows a schematic diagram of a device 200 for estimating a screen light leakage amount of an embodiment of the present application. As shown in FIG. 2, the device 200 includes:

a first acquisition unit 210, for acquiring a first screen light leakage estimation model of a first electronic device;

a second acquisition unit 220, for acquiring a first detection value of a variable of the screen light leakage estimation model of the first electronic device under a preset configuration;

a third acquisition unit 230, for acquiring a second detection value of the variable of a second electronic device under the preset configuration;

a first determination unit 240, for determining a difference coefficient of the second electronic device relative to the first electronic device according to the first detection value and the second detection value; and a second determination unit 250, for determining a second screen light leakage estimation model of the second electronic device according to the first screen light leakage estimation model and the difference coefficient, and the second screen light leakage estimation model being configured to estimate the screen light leakage amount of the second electronic device.

Optionally, in an embodiment of the present application, the variable includes a screen light leakage amount and a drop depth of a screen light-emitting drop waveform, the first screen light leakage estimation model is a fitting function of the screen light leakage amount and the drop depth of the first electronic device, and the preset configuration includes a preset bright value and a preset gray value; the first detection value includes a first screen light leakage amount detection value and a first drop depth detection value of the first electronic device under the preset bright value and the preset gray value, and the second detection value includes a second screen light leakage amount detection value and a second drop depth detection value of the second electronic device under the preset bright value and the preset gray value; and the first determination unit 240 is specifically configured to: determine the difference coefficient according to a ratio of the first screen light leakage amount detection value to the second screen light leakage amount detection value, and a ratio of the first drop depth detection value to the second drop depth detection value.

Optionally, in an embodiment of the present application, the difference coefficient includes a first difference coefficient and a second difference coefficient, the first determination unit 240 is specifically configured to: determine the ratio of the first screen light leakage amount detection value to the second screen light leakage amount detection value as the first difference coefficient; and determine the ratio of the first drop depth detection value to the second drop depth detection value as the second difference coefficient.

Optionally, in an embodiment of the present application, where the first screen light leakage estimation model is:

$$S = \sum_{i=0}^{n-1} k_i * D^i;$$

where S represents the screen light leakage amount of the first electronic device, D represents the drop depth of the first electronic device, k represents the fitting coefficient of the first screen light leakage estimation model, and i is an exponent number;

the second screen light leakage estimation model is:

$$S' = \frac{\sum_{i=0}^{n-1} k_i * (D' * \omega)^i}{\varphi};$$

and where S' represents the screen light leakage amount of the second electronic device, D' represents the drop depth of the second electronic device, ω is the first difference coefficient, and φ is the second difference coefficient.

Optionally, in an embodiment of the present application, the variable includes the screen light leakage amount and an R unit color gray value, a G unit color gray value and a B unit color gray value, the first screen light leakage estimation model is the fitting function of the screen light leakage amount of the first electronic device and the R unit color gray value, the G unit color gray value and the B unit color gray value, and the preset configuration includes a preset first bright value, a preset second bright value, a preset third bright value, a preset first gray value, a preset second gray value and a preset third gray value; the first detection value includes a detection value of a third screen light leakage amount of the first electronic device under the preset first bright value and the preset first gray value when a screen displays a R unit color, a detection value of a fourth screen light leakage amount under the preset second bright value and the preset second gray value when the screen displays a G unit color and a detection value of a fifth screen light leakage amount under the preset third bright value and the preset third gray value when the screen displays a B unit color, the second detection value includes a detection value of a sixth screen light leakage amount of the second electronic device under the preset first bright value and the preset first gray value when the screen displays the R unit color, a detection value of a seventh screen light leakage amount under the preset second bright value and the preset second gray value when the screen displays the G unit color and a detection value of a eighth screen light leakage amount under the preset third bright value and the preset third gray value when the screen displays the B unit color; and where the first determination unit 240 is specifically configured to: determine the difference coefficient according to a ratio of the detection value of the third screen light leakage amount to the detection value of the sixth screen light leakage amount, a ratio of the detection value of the fourth screen light leakage amount to the detection value of the seventh screen light leakage amount, and a ratio of the detection value of the fifth screen light leakage amount to the detection value of the eighth screen light leakage amount.

Optionally, in an embodiment of the present application, the difference coefficient includes a third difference coefficient, a fourth difference coefficient and a fifth difference coefficient, the first determination unit 240 is specifically configured to: determine the ratio of the third screen light leakage amount detection value to the sixth screen light leakage amount detection value as the third difference coefficient; determine the ratio of the fourth screen light leakage amount detection value to the seventh screen light leakage amount detection value as the fourth difference coefficient; and determine the ratio of the fifth screen light leakage amount detection value to the eighth screen light leakage amount detection value as the fifth difference coefficient.

Optionally, in an embodiment of the present application, the first screen light leakage estimation model is:

$$S = \sum_{i=0}^{n-1} x_i * R^i_{gray} + \sum_{i=0}^{n-1} y_i * G^i_{gray} + \sum_{i=0}^{n-1} z_i * B^i_{gray};$$

where S represents the screen light leakage amount of the first electronic device, $R_{gray}$ represents the R unit color gray value, $G_{gray}$ represents the G unit color gray value, $B_{gray}$ represents the B unit color gray value, x, y, and z represent the fitting coefficients of the first screen light leakage estimation model, and i represents an exponent number;

the second screen light leakage estimation model is:

$$S' = \frac{\sum_{i=0}^{n-1} x_i * R^i_{gray}}{\alpha} + \frac{\sum_{i=0}^{n-1} y_i * R^i_{gray}}{\beta} + \frac{\sum_{i=0}^{n-1} z_i * R^i_{gray}}{\chi};$$

and where S' represents the screen light leakage amount of the second electronic device, α represents the third difference coefficient, β represents the fourth difference coefficient, and χ represents the fifth difference coefficient.

Figure 3:
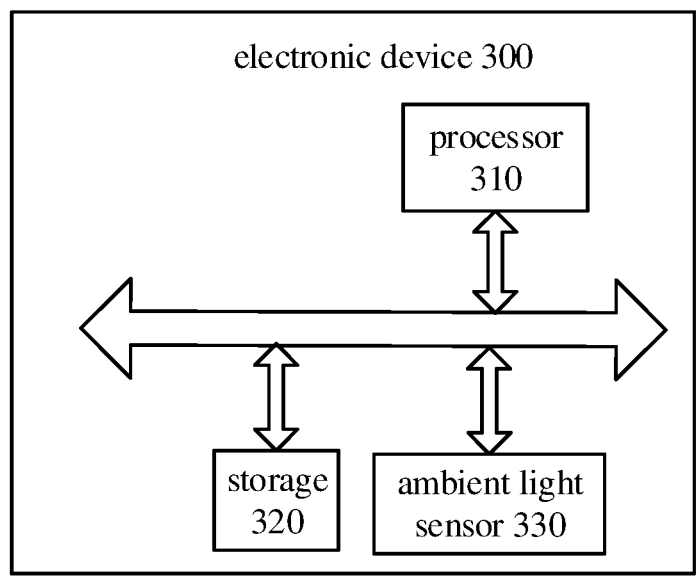
FIG. 3 is a schematic diagram of an electronic device provided by an embodiment of the present application.

FIG. 3 shows a schematic diagram of an electronic device 300 of an embodiment of the present application. The electronic device 300 shown in FIG. 3 includes a processor 310, the processor 310 may call a computer program from a memory and run it to implement the method in the embodiment of the present application. The electronic device may be the above second electronic device.

Optionally, as shown in FIG. 3, the electronic device 300 may further include a memory 320. Where the processor 310 may call a computer program from the memory 320 and run it to implement the method in the embodiment of the present application.

Where the memory 320 may be a separate component independent of the processor 310 or may be integrated in the processor 310.

Optionally, the electronic device 300 further includes an ambient light sensor 330, the ambient light sensor 330 is provided under a display screen to detect ambient light, and the processor 310 may subtract the screen light leakage amount estimated by a second screen light leakage estimation model obtained by using the method 100 of the embodiment of the present application from the ambient light detected by the ambient light sensor 330, so as to obtain relatively accurate ambient light.

An embodiment of the present application further provides a chip, and the chip includes a processor, the processor may call a computer program from the memory and run it to implement the method in the embodiment of the present application.

Optionally, the chip can be applied to an electronic device 300 in the embodiments of the present application, and the chip can implement the corresponding processes implemented by the processor 310 in the electronic device 300 in each method of the embodiments of the present application, which will not be redundantly herein for brevity.

It should be understood that the chip mentioned in the embodiments of the present application may also be referred to as a system-on-chip, system chip, chip system or system on a chip, etc.

Optionally, an embodiment of the present application further provides a computer-readable medium, which is configured to store a computer program to implement the method in the embodiment of the present application.

By way of example and not limitation, the electronic device in the embodiment of the present application may be portable or mobile computing devices such as a terminal device, a mobile phone, a tablet computer, a notebook computer, a desktop computer, a gaming device, an in-vehicle electronic device or a wearable smart device, and other electronic devices such as an electronic database, an automobile and an automated teller machine (ATM). The wearable smart device includes a device that is full-featured and large-sized and may realize complete or partial functions without relying on a smart phone, such as a smart watch or smart glasses, and includes a device that only focuses on a certain type of application function, and shall be used in cooperation with such other device as a smart phone, such as various types of smart bracelets, smart jewelry and other devices for physical sign monitoring.

Those of ordinary skill in the art may be aware that, units and algorithm steps of the examples described in the embodiments disclosed herein may be implemented by electronic hardware, or a combination of computer software and computer software. Whether these functions are performed by hardware or software depends on particular applications and designed constraint conditions of the technical solutions. Persons skilled in the art may use different methods to implement the described functions for every particular application, but it should not be considered that such implementation goes beyond the scope of the present application.

Those skilled in the art to which the present disclosure pertains may clearly understand that, for convenience and simplicity of description, the specific working processes of the system, the apparatus and the units described above may refer to corresponding processes in the foregoing method embodiments, and will not be repeated redundantly herein.

In the several embodiments provided in the present disclosure, it should be understood that the disclosed system, apparatus, and method may be implemented in other method s. For example, the embodiments of the above-described apparatus are only exemplary, for example, the division of the units is only a logic function division, other division models may be adopted in practice, e.g., multiple units or components may be combined or integrated in another system, or some characteristics may be omitted or be not executed. From another point of view, the displayed or discussed mutual coupling or direct coupling or communication connection may be indirect coupling or communication connection via some interfaces, devices or units, and may be in electrical, mechanical or other forms.

The units described as separate parts may be or may not be separated physically, and a component displayed as a unit may be or may not be a physical unit, namely, may be located in one place, or may be distributed on a plurality of network units. Some or all of the units may be selected to achieve the purposes of the solutions in the present embodiments according to actual needs.

In addition, each functional unit in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such understanding, the technical solutions of the present application substantially, or the part of the present application making contribution to the prior art, or a part of the technical solution may be embodied in the form of a software product, and the computer software product is stored in a storage medium, which includes multiple instructions enabling computer equipment (which may be a personal computer, a server, network equipment or the like) to execute all of or part of the steps in the methods of the embodiments of the present application. The foregoing storage medium includes: various media capable of storing program codes, such as a U disk, a mobile hard disk, a read-only memory (ROM), a random access memory (RAM), a disk, an optical disk or the like.

Described above are the specific implementation methods of the present application only, but the protection scope of the present application is not limited thereto, those skilled who are familiar with the art could readily think of variations or substitutions within the technical scope disclosed by the present application, and these variations or substitutions shall fall within the protection scope of the present application. Therefore, the protection scope of the present application shall be subject to the protection scope of the claims.

What is claimed is:

1. A method for estimating a screen light leakage amount, applying to a second electronic device, wherein the second electronic device comprises a processor, a display screen and an ambient light sensor, and the ambient light sensor is arranged under the display screen, the method comprising:
   acquiring, by the processor, a first screen light leakage estimation model of a first electronic device;
   acquiring, by the processor, a first detection value of a variable of the screen light leakage estimation model of the first electronic device under a preset configuration;
   acquiring, by the processor, a second detection value for the variable of the second electronic device under the preset configuration;
   determining, by the processor, a difference coefficient of the second electronic device relative to the first electronic device according to the first detection value and the second detection value; and
   determining, by the processor, a second screen light leakage estimation model of the second electronic device according to the first screen light leakage estimation model and the difference coefficient, and the second screen light leakage estimation model being configured to estimate the screen light leakage amount of the second electronic device;
   detecting, by the ambient light sensor, an ambient light;
   subtracting, by the processor, the screen light leakage amount from the ambient light, to obtain relatively accurate ambient light.

2. The method according to claim 1, wherein the variable comprises a screen light leakage amount and a drop depth of a screen light-emitting drop waveform, the first screen light leakage estimation model is a fitting function of the screen light leakage amount and the drop depth of the first electronic device, and the preset configuration comprises a preset bright value and a preset gray value;
   the first detection value comprises a first screen light leakage amount detection value and a first drop depth detection value of the first electronic device under the preset bright value and the preset gray value, and the second detection value comprises a second screen light leakage amount detection value and a second drop depth detection value of the second electronic device under the preset bright value and the preset gray value; and
   the determining the difference coefficient of the second electronic device relative to the first electronic device according to the first detection value and the second detection value comprises:
   determining the difference coefficient according to a ratio of the first screen light leakage amount detection value to the second screen light leakage amount detection value, and a ratio of the first drop depth detection value to the second drop depth detection value.

3. The method according to claim 2, wherein the difference coefficient comprises a first difference coefficient and a second difference coefficient, and the determining the difference coefficient according to the ratio of the first screen light leakage amount detection value to the second screen light leakage amount detection value, and the ratio of the first drop depth detection value to the second drop depth detection value, comprises:
   determining the ratio of the first screen light leakage amount detection value to the second screen light leakage amount detection value as the first difference coefficient; and
   determining the ratio of the first drop depth detection value to the second drop depth detection value as the second difference coefficient.

4. The method according to claim 3, wherein the first screen light leakage estimation model is:

$$S = \sum_{i=0}^{n-1} k_i * D^i;$$

wherein S represents the screen light leakage amount of the first electronic device, D represents the drop depth of the first electronic device, k represents a fitting coefficient of the first screen light leakage estimation model, and i is an exponent number;
the second screen light leakage estimation model is:

$$S' = \frac{\sum_{i=0}^{n-1} k_i * (D' * \omega)^i}{\varphi};$$

and
wherein S' represents the screen light leakage amount of the second electronic device, D' represents the drop depth of the second electronic device, w is the first difference coefficient, and φ is the second difference coefficient.

5. The method according to claim 1, wherein the variable comprises a screen light leakage amount and an R unit color gray value, a G unit color gray value and a B unit color gray value, the first screen light leakage estimation model is a fitting function of the screen light leakage amount of the first electronic device and the R unit color gray value, the G unit color gray value and the B unit color gray value, and the preset configuration comprises a preset first bright value, a preset second bright value, a preset third bright value, a preset first gray value, a preset second gray value and a preset third gray value;
   the first detection value comprises a third screen light leakage amount detection value under the first bright value and the first gray value when a screen displays a R unit color, a fourth screen light leakage amount detection value under the second bright value and the second gray value when the screen displays a G unit color and a fifth screen light leakage amount detection value under the third bright value and the third gray value when the screen displays a B unit color of the first electronic device, the second detection value comprises a sixth screen light leakage amount detection value under the first bright value and the first gray value when the screen displays the R unit color, a seventh screen light leakage amount detection value under the second bright value and the second gray value when the screen displays the G unit color and an eighth screen light leakage amount detection value under the third bright value and the third gray value when the screen displays the B unit color of the second electronic device; and the determining the difference coefficient of the second electronic device relative to the first electronic device according to the first detection value and the second detection value, comprises:

determining the difference coefficient according to a ratio of the third screen light leakage amount detection value to the sixth screen light leakage amount detection value, a ratio of the fourth screen light leakage amount detection value to the seventh screen light leakage amount detection value, and a ratio of the fifth screen light leakage amount detection value to the eighth screen light leakage amount detection value.

6. The method according to claim 5, wherein the difference coefficient comprises a third difference coefficient, a fourth difference coefficient and a fifth difference coefficient, and the determining the difference coefficient according to the ratio of the third screen light leakage amount detection value to the sixth screen light leakage amount detection value, the ratio of the fourth screen light leakage amount detection value to the seventh screen light leakage amount detection value, and the ratio of the fifth screen light leakage amount detection value to the eighth screen light leakage amount detection value, comprises:

determining the ratio of the third screen light leakage amount detection value to the sixth screen light leakage amount detection value as the third difference coefficient;

determining the ratio of the fourth screen light leakage amount detection value to the seventh screen light leakage amount detection value as the fourth difference coefficient; and determining the ratio of the fifth screen light leakage amount detection value to the eighth screen light leakage amount detection value as the fifth difference coefficient.

7. The method according to claim 6, wherein the first screen light leakage estimation model is:

$$S = \sum_{i=0}^{n-1} x_i * R^i_{gray} + \sum_{i=0}^{n-1} y_i * G^i_{gray} + \sum_{i=0}^{n-1} z_i * B^i_{gray};$$

wherein S represents the screen light leakage amount of the first electronic device, $R_{gray}$ represents the R unit color gray value, $G_{gray}$ represents the G unit color gray value, $B_{gray}$ represents the B unit color gray value, x, y, and z represent fitting coefficients of the first screen light leakage estimation model, and i represents the exponent number;

the second screen light leakage estimation model is:

$$S' = \frac{\sum_{i=0}^{n-1} x_i * R^i_{gray}}{\alpha} + \frac{\sum_{i=0}^{n-1} y_i * R^i_{gray}}{\beta} + \frac{\sum_{i=0}^{n-1} z_i * R^i_{gray}}{\chi};$$

and wherein S' represents the screen light leakage amount of the second electronic device, a represents the third difference coefficient, β represents the fourth difference coefficient, and x represents the fifth difference coefficient.

8. An electronic device, wherein the electronic device is a second electronic device, the electronic device comprises a processor, a display screen and an ambient light sensor, the ambient light sensor is arranged under the display screen, and the processor is configured to:

acquire a first screen light leakage estimation model of a first electronic device;

acquire a first detection value of a variable of the screen light leakage estimation model of the first electronic device under a preset configuration;

acquire a second detection value for the variable of the second electronic device under the preset configuration;

determine a difference coefficient of the second electronic device relative to the first electronic device according to the first detection value and the second detection value; and determine a second screen light leakage estimation model of the second electronic device according to the first screen light leakage estimation model and the difference coefficient, and the second screen light leakage estimation model being configured to estimate the screen light leakage amount of the second electronic device;

the ambient light sensor is configured to detect an ambient light;

the processor is configured to subtract the screen light leakage amount from the ambient light to obtain relatively accurate ambient light.

9. The electronic device according to claim 8, wherein the variable comprises a screen light leakage amount and a drop depth of a screen light-emitting drop waveform, the first screen light leakage estimation model is a fitting function of the screen light leakage amount and the drop depth of the first electronic device, and the preset configuration comprises a preset bright value and a preset gray value;

the first detection value comprises a first screen light leakage amount detection value and a first drop depth detection value of the first electronic device under the preset bright value and the preset gray value, and the second detection value comprises a second screen light leakage amount detection value and a second drop depth detection value of the second electronic device under the preset bright value and the preset gray value; and the processor is configured to:

determine the difference coefficient according to a ratio of the first screen light leakage amount detection value to the second screen light leakage amount detection value, and a ratio of the first drop depth detection value to the second drop depth detection value.

10. The electronic device according to claim 9, wherein the difference coefficient comprises a first difference coefficient and a second difference coefficient, and the processor is configured to:

determine the ratio of the first screen light leakage amount detection value to the second screen light leakage amount detection value as the first difference coefficient; and determine the ratio of the first drop depth detection value to the second drop depth detection value as the second difference coefficient.

11. The electronic device according to claim 10, wherein the first screen light leakage estimation model is:

$$S = \sum_{i=0}^{n-1} k_i * D^i;$$

wherein S represents the screen light leakage amount of the first electronic device, D represents the drop depth of the first electronic device, k represents a fitting coefficient of the first screen light leakage estimation model, and i is an exponent number;

the second screen light leakage estimation model is:

$$S' = \frac{\sum_{i=0}^{n-1} k_i * (D' * \omega)^i}{\varphi};$$

and wherein S' represents the screen light leakage amount of the second electronic device, D' represents the drop depth of the second electronic device, w is the first difference coefficient, and φ is the second difference coefficient.

12. The electronic device according to claim 8, wherein the variable comprises a screen light leakage amount and an R unit color gray value, a G unit color gray value and a B unit color gray value, the first screen light leakage estimation model is a fitting function of the screen light leakage amount of the first electronic device and the R unit color gray value, the G unit color gray value and the B unit color gray value, and the preset configuration comprises a preset first bright value, a preset second bright value, a preset third bright value, a preset first gray value, a preset second gray value and a preset third gray value;

the first detection value comprises a third screen light leakage amount detection value under the first bright value and the first gray value when a screen displays a R unit color, a fourth screen light leakage amount detection value under the second bright value and the second gray value when the screen displays a G unit color and a fifth screen light leakage amount detection value under the third bright value and the third gray value when the screen displays a B unit color of the first electronic device, the second detection value comprises a sixth screen light leakage amount detection value under the first bright value and the first gray value when the screen displays the R unit color, a seventh screen light leakage amount detection value under the second bright value and the second gray value when the screen displays the G unit color and an eighth screen light leakage amount detection value under the third bright value and the third gray value when the screen displays the B unit color of the second electronic device; and the processor is configured to:
determine the difference coefficient according to a ratio of the third screen light leakage amount detection value to the sixth screen light leakage amount detection value, a ratio of the fourth screen light leakage amount detection value to the seventh screen light leakage amount detection value, and a ratio of the fifth screen light leakage amount detection value to the eighth screen light leakage amount detection value.

13. The electronic device according to claim 12, wherein the difference coefficient comprises a third difference coefficient, a fourth difference coefficient and a fifth difference coefficient, and the processor is configured to:
determine the ratio of the third screen light leakage amount detection value to the sixth screen light leakage amount detection value as the third difference coefficient;
determine the ratio of the fourth screen light leakage amount detection value to the seventh screen light leakage amount detection value as the fourth difference coefficient; and
determine the ratio of the fifth screen light leakage amount detection value to the eighth screen light leakage amount detection value as the fifth difference coefficient.

14. The electronic device according to claim 13, wherein the first screen light leakage estimation model is:

$$S = \sum_{i=0}^{n-1} x_i * R^i_{gray} + \sum_{i=0}^{n-1} y_i * G^i_{gray} + \sum_{i=0}^{n-1} z_i * B^i_{gray};$$

wherein S represents the screen light leakage amount of the first electronic device, $R_{gray}$ represents the R unit color gray value, $G_{gray}$ represents the G unit color gray value, $B_{gray}$ represents the B unit color gray value, x, y, and z represent fitting coefficients of the first screen light leakage estimation model, and i represents the exponent number;

the second screen light leakage estimation model is:

$$S' = \frac{\sum_{i=0}^{n-1} x_i * R^i_{gray}}{\alpha} + \frac{\sum_{i=0}^{n-1} y_i * R^i_{gray}}{\beta} + \frac{\sum_{i=0}^{n-1} z_i * R^i_{gray}}{\chi};$$

and wherein S' represents the screen light leakage amount of the second electronic device, α represents the third difference coefficient, β represents the fourth difference coefficient, and λ represents the fifth difference coefficient.

* * * * *